UNITED STATES PATENT OFFICE.

CHARLES S. BASH, JR., OF FORT WAYNE, INDIANA, ASSIGNOR OF ONE-THIRD TO CHARLES S. BASH, SR., AND ONE-THIRD TO WILLIAM E. WEBBE, BOTH OF FORT WAYNE, INDIANA.

PROCESS OF PREPARING LAND-FERTILIZERS.

1,048,454.

Specification of Letters Patent. Patented Dec. 24, 1912.

Application filed April 12, 1912. Serial No. 690,354.

No Drawing.

*To all whom it may concern:*

Be it known that I, CHARLES S. BASH, Jr., a citizen of the United States, residing at Fort Wayne, in the county of Allen, in the State of Indiana, have invented certain new and useful Improvements in Processes of Preparing Land-Fertilizers; and I do hereby declare that the following is a full, clear, and exact description of the invention, which will enable others skilled in the art to which it appertains to make and use the same.

My present invention relates to the process of preparing land fertilizers from soluble rocks.

It is well known that at present rock phosphate is acidulated or reduced to a soluble condition by a proper mixture of sulfuric acid therewith; that rock thus acidulated is sometimes sold as a commercial product, and sometimes mixed with muck or peat, or other earthy material, to form a fertilizer; that the chemical action of the sulfuric acid upon the rock during the acidulating process develops a heat therein amounting to about 250 degrees Fahrenheit; that with the present process of acidulating the phosphate rock only high grade rock is used because when the low grade rock is used the high percentage of iron and aluminum oxids and phosphates develops objectionable qualities by the reaction of the heat during the acidulating process; that such reaction makes the resulting mixture pasty thereby rendering it difficult to dry, and when such pasty mixture is dried it absorbs moisture in storage and makes the product hard to drill into the soil; and that the muck or peat is at present dried separately under a high degree of heat and then afterward mixed with the acidulated rock.

The object, therefore, of my invention is to overcome the above difficulties by employing a process of mixing the acid and phosphate rock with the muck or peat in its natural state without the necessity for a sufficiently high degree of heat to cause any reaction upon the iron and aluminum oxids, thereby enabling me to use the more economical low grade rock with the same facility and advantages that are obtained by the use of high grade rock, and thereby avoiding the objectionable effects of the accumulated moisture upon the finished product in storage.

Another object of my invention is to make a material saving in the fuel necessary to produce the required heat for the drying process.

My improved process consists, briefly stated, in mixing the phosphate rock, the properly diluted sulfuric acid, and the wet muck or peat in its natural state all together in a suitable mechanical mixer. This mixture develops a chemical heat of only about 170 degrees Fahrenheit, which is not sufficient heat to cause the above stated objectionable chemical action on the iron and aluminum oxids. This mixture is allowed to stand or season for about 48 hours during which time the acid also acts upon the peat and renders the nitrogen therein more available as plant food. This mixture subjected to the above chemical heat leaves the peat or muck with only about 30% of the water which it originally contained. This composition of acidulated rock and peat is then properly dried with application of heat in any suitable mechanical drier after which it is ready for use.

It is obvious that as a large amount of the water in the peat is eliminated by the chemical heat developed in the acidulating process, a material saving of fuel is secured over the present process of drying the peat separately. It is also obvious that with my improved process I can utilize the cheaper and lower grade phosphate rock which cannot now be used in the manufacture of fertilizers, for the reasons before described, and that the objectionable pasty condition of the composition by the reaction of the acid upon the oxids is eliminated.

It is well known in the art that about .63 lbs. of sulfuric acid is required for each pound of calcium phosphate and that about .29 pounds of water is required to dilute the sulfuric acid before it is put on the rock in the making of acid phosphate.

In the use of my process all that is required is that any proper proportions of the component materials be employed with the proper heat, and any suitable mechanical mixer, all of which can readily be determined by experiment, and all of which can readily be determined by those familiar with the art.

Assuming that one-thousand pounds of rock phosphate and one-thousand pounds of peat are placed in a mechanical mixer in the employment of my process, the operator then adds to the mixture a sufficient quantity of sulfuric acid to cause a complete decomposition of the calcium phosphate present in the rock. Should the rock contain for example, 60% calcium phosphate then in that case about thirty-eight pounds of pure sulfuric acid would be required to effect complete decomposition of the calcium phosphate. Obviously should such rock contain a smaller percentage of calcium phosphate a proportionately smaller percentage of sulfuric acid woul be required.

Having thus described my invention and manner of employing the same what I desire to secure by Letters Patent is:

1. The process of producing fertilizers consisting of the following steps: first mixing phosphate rock, sulfuric acid, and peat or muck in its natural state substantially as herein described and then drying the composition thus formed by the application of heat.

2. The process of producing a fertilizer by compounding phosphate rock, sulfuric acid, and undried peat, substantially as herein described, and then subjecting the composition to a drying process.

Signed by me at Fort Wayne, Allen county, State of Indiana, this 10th day of April, 1912.

CHARLES S. BASH, Jr.

Witnesses:
WILLIAM E. WEBBE,
ANNA L. DENNY.